United States Patent
Sartorello et al.

(10) Patent No.: US 12,299,294 B2
(45) Date of Patent: May 13, 2025

(54) OBJECT STORAGE SERVICE WITH MANAGED CACHE AND COMMON INTERFACE FOR ACCESSING ACCELERATED AND NON-ACCELERATED ACCESS OBJECTS

(71) Applicant: Amazon Technologies, Inc., Seattle, WA (US)

(72) Inventors: Enrico Sartorello, Berlin (DE); Jessie E Felix, Berlin (DE); Seth W. Markle, Seattle, WA (US); Andrew Kent Warfield, Vancouver (CA); Leon Thrane, Seattle, WA (US); Valentin Flunkert, Berlin (DE); Miroslav Miladinovic, Berlin (DE); Christoph Bartenstein, Vienna (AT); James C Kirschner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/345,890

(22) Filed: Jun. 30, 2023

(65) Prior Publication Data
US 2025/0004648 A1    Jan. 2, 2025

(51) Int. Cl.
*G06F 3/06* (2006.01)
(52) U.S. Cl.
CPC ............ *G06F 3/0622* (2013.01); *G06F 3/065* (2013.01); *G06F 3/0679* (2013.01)
(58) Field of Classification Search
CPC ...... G06F 3/065; G06F 3/0679; G06F 3/0622; G06F 3/0659; G06F 3/061; G06F 16/172; G06F 2212/214; G06F 2212/283; G06F 2212/465; G06F 2212/466; G06F 3/0685; H04L 67/568

USPC ......................................................... 711/154
See application file for complete search history.

(56) References Cited

U.S. PATENT DOCUMENTS

| | | |
|---|---|---|
| 1,057,997 A | 4/1913 | Doeblin |
| 5,404,510 A | 4/1995 | Smith et al. |
| 5,918,225 A | 6/1999 | White et al. |
| 6,502,088 B1 | 12/2002 | Gajda et al. |

(Continued)

OTHER PUBLICATIONS

International Search Report and Written Opinion mailed Sep. 10, 2024 in PCT/US2024/034479, Amazon Technologies, Inc., pp. 1-12.

(Continued)

*Primary Examiner* — Hua J Song
(74) *Attorney, Agent, or Firm* — Alexander A. Knapp; Kowert, Hood, Munyon, Rankin & Goetzel, P.C.

(57) ABSTRACT

An object storage system includes mass storage devices that implement general storage for objects stored in the object storage system and additionally includes other storage devices, such as solid-state drives, that provide higher performance storage access. The object storage system implements a common access interface for accessing both accelerated access objects (who are eligible to have cached copies stored on the higher performance storage devices) and non-accelerated access objects stored in the general storage. The cache is fully managed by the service and no changes are required for client applications to receive accelerated access to objects that are classified as accelerated access objects per a customer configurable acceleration policy for the object or for a bucket in which the object is stored.

20 Claims, 9 Drawing Sheets

(56) References Cited

U.S. PATENT DOCUMENTS

| | | |
|---|---|---|
| 6,591,269 B1 | 7/2003 | Ponnekanti |
| 6,778,977 B1 | 8/2004 | Avadhanam et al. |
| 6,914,883 B2 | 7/2005 | Dharanikota |
| 6,947,750 B2 | 9/2005 | Kakani et al. |
| 8,239,584 B1 | 8/2012 | Rabe et al. |
| 8,595,267 B2 | 11/2013 | Sivasubramanian et al. |
| 8,650,156 B1 | 2/2014 | McHugh |
| 8,918,435 B2 | 12/2014 | Sivasubramanian et al. |
| 9,052,830 B1 | 6/2015 | Marshak |
| 9,053,054 B1 | 6/2015 | McHugh |
| 9,432,459 B2 | 8/2016 | Sivasubramanian et al. |
| 9,639,546 B1 | 5/2017 | Gorski et al. |
| 9,699,263 B1 * | 7/2017 | Shats .................. H04L 67/5682 |
| 9,754,009 B2 | 9/2017 | Sivasubramanian et al. |
| 9,875,262 B2 | 1/2018 | McHugh |
| 10,235,055 B1 | 3/2019 | Saad et al. |
| 10,296,633 B1 | 5/2019 | Collins |
| 10,430,103 B1 | 10/2019 | Jamail et al. |
| 10,528,537 B2 | 1/2020 | McHugh |
| 10,623,319 B1 | 4/2020 | Talnikov et al. |
| 10,817,203 B1 | 10/2020 | Anand |
| 10,901,643 B2 | 1/2021 | Jamail et al. |
| 11,151,081 B1 | 10/2021 | Anand |
| 11,221,782 B1 | 1/2022 | Idicula et al. |
| 2002/0087699 A1 | 7/2002 | Karagiannis et al. |
| 2007/0143242 A1 | 6/2007 | Miller et al. |
| 2007/0195788 A1 | 8/2007 | Vasamsetti et al. |
| 2012/0317155 A1 | 12/2012 | Ogasawara et al. |
| 2013/0166839 A1 | 6/2013 | Burton |
| 2014/0047181 A1 | 2/2014 | Peterson et al. |
| 2014/0082288 A1 | 3/2014 | Beard |
| 2014/0310455 A1 | 10/2014 | Baldwin |
| 2015/0058302 A1 | 2/2015 | Abney, III et al. |
| 2015/0378628 A1 | 12/2015 | Golander |
| 2016/0357443 A1 | 12/2016 | Li |
| 2017/0329552 A1 | 11/2017 | Baldwin |
| 2018/0210656 A1 | 7/2018 | Sato |
| 2019/0121750 A1 | 4/2019 | Keeton et al. |
| 2019/0215363 A1 | 7/2019 | Olson |
| 2020/0042618 A1 | 2/2020 | Mukku |
| 2020/0201759 A1 | 6/2020 | Korzh |
| 2022/0043594 A1 | 2/2022 | Idicula et al. |
| 2023/0176908 A1 * | 6/2023 | Sinha .................... G06F 9/5072 718/100 |

OTHER PUBLICATIONS

Barish Greg, et al., "World wide Web Caching: Trends and Techniques," IEEE Communications Magazine, May 2000, pp. 178-185, vol. 38, No. 5, IEEE Service Center, Piscataway, US.

* cited by examiner

OBJECT STORAGE SERVICE WITH MANAGED CACHE AND COMMON INTERFACE FOR ACCESSING ACCELERATED AND NON-ACCELERATED ACCESS OBJECTS

BACKGROUND

A provider network may offer, to various clients, access to data storage resources, computing resources and/or various other services implemented using data storage resources and/or computing resources. For example, using such resources, a provider network may store data on behalf of customers of the provider network in various types of storage solutions. Also, the provider network may offer various types of storage-related services for managing stored data, such as database services, object-based storage services, cloud computing services, etc.

For various reasons, delays in access to some pieces of data stored in a data storage resource of a provider network for a given customer may have less of an impact on the given customer's operations than delays in accessing other pieces of data stored for the given customer. Also, storage resources that meet greater access requirements (e.g., shorter time to access) may be more costly than other storage resources with less stringent access requirements.

In some situations, pieces of data that need to be accessed with lower latency may be stored in a separate storage resource that provides lower latency access. However, managing additional separate storage resources and re-configuring client applications to locate pieces of data in the additional separate storage resources may be time-consuming and add additional costs and complexity for customers.

BRIEF DESCRIPTION OF THE DRAWINGS

FIG. 7 further illustrates example acceleration configurations that may be applied to buckets, or to objects, residing in particular buckets and/or having particular prefixes, tags, or other identifying elements, according to some embodiments.

Figure 1:
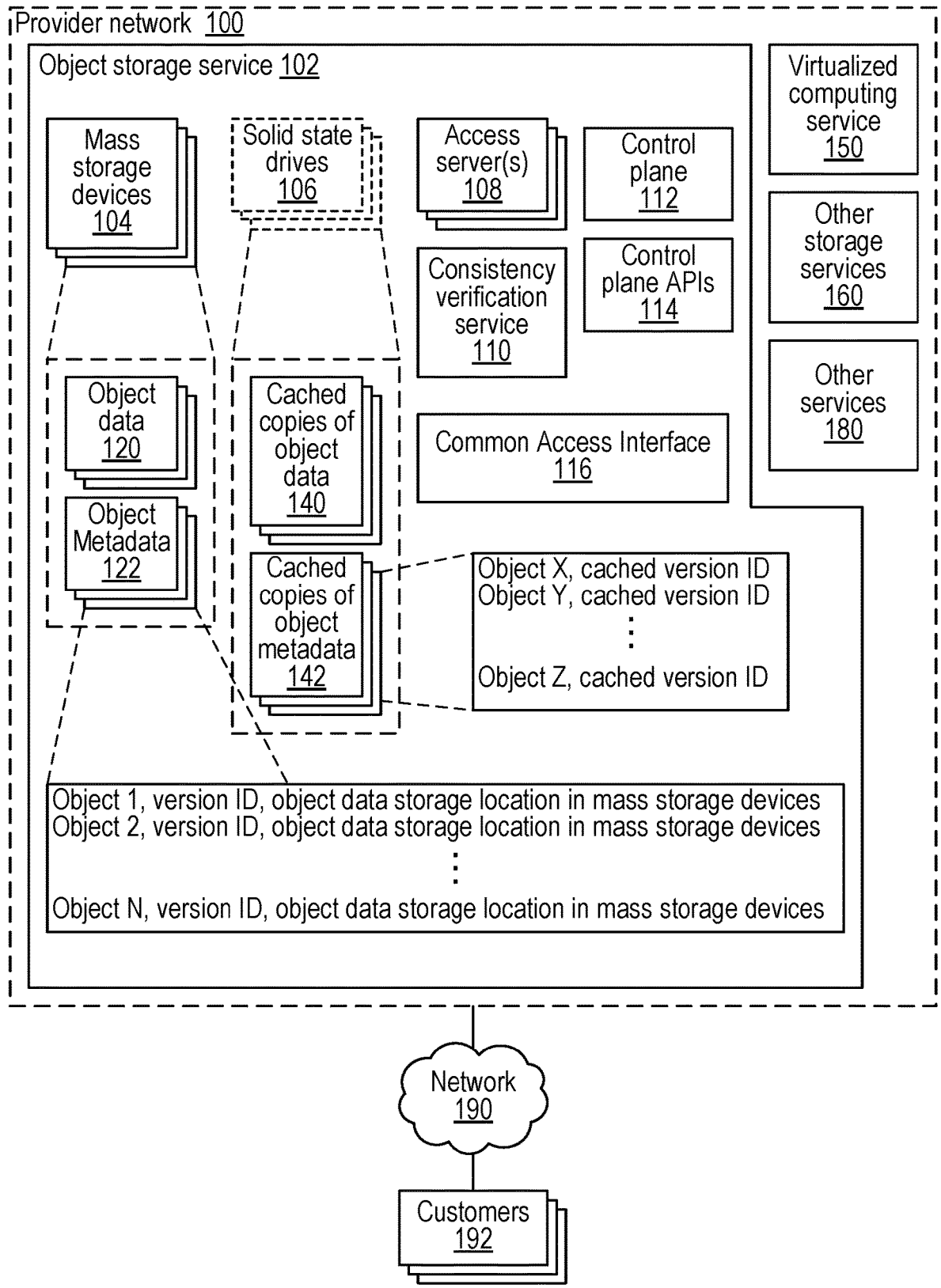
FIG. 1 illustrates a logical block diagram of an object storage service included in a service provider network, wherein the object storage service implements a fully managed cache for accelerated access objects and provides a common interface for accessing both accelerated and non-accelerated access objects, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for implementing an object storage service with a common access interface for accessing both accelerated access objects and non-accelerated access objects are described herein.

In some embodiments, data items may be structured as objects and stored in secure, durable, highly scalable object storage in storage locations referred to as "buckets." A storage service object, for example, may include object data and object metadata, such as a key and other metadata; the object key (or key name, or identifier) may uniquely identify a key-addressable object in a bucket, and an index of such keys (e.g., a directory file) may also be included in the object metadata. As used herein "object data" may refer to the "data" of the object and "object metadata" may include one or more of the key for the object, the metadata of the object, and/or an index entry for the object.

In some embodiments, clients may use client devices to perform or request suitable operations for reading, writing, or modifying data items (e.g., objects) stored in a data store, such as a bucket of the object storage service. In some embodiments, the client devices may be virtualized computing resources implemented using other services of a service provider network that also includes the object storage service. The object storage service may expose a client interface to enable clients to participate in such operations. In some embodiments, a client interface may represent a single, unified interface. The client interface may include any suitable user and/or programmatic interfaces, such as application programming interfaces (APIs) enabling operations such as "put" and "get." In some embodiments, a client interface may provide access to objects stored in multiple buckets of one or more data stores implemented in the object storage service for customers of the object storage service. In some embodiments, a customer may implement multiple client applications using multiple computing resources of the service provider network.

Generally speaking, the term "data store," as used herein, may refer to a collection of one or more data items and/or data objects and associated object metadata set up on behalf of one or more clients. In some embodiments, a "data store" implemented in an object storage service may include multiple buckets. After a data store has been created, a client may start populating various data items within the data store, e.g., using requests for operations such as "create object," "update object," "insert object," "delete object," or other similar requests at various granularity levels depending on the data store type.

For various reasons customers of a data storage service may desire accelerated access to objects stored in the data storage service. For example, a customer of a provider network may implement client applications using virtualized computing instances of the service provider network and these client applications may access objects stored in an object storage service in order to perform functions of the applications. For example, analytical applications may access objects stored in a data lake, wherein the data lake uses the object storage service to store data objects. Depending on the types of analytics that are being performed, some objects may be more frequently accessed than others. Thus, allowing for some objects to have faster access times than others may improve application performance, but also enables an efficient use of resources by not requiring all data objects to be stored on higher cost storage that provides the faster access times.

While some customers may attempt to implement high performance storage as a separate solution from an object storage service, such attempts may be costly and time consuming. For example, application code may have to be updated (and re-updated) to keep track of which objects are stored on the higher performance storage and which objects are stored on standard storage, such as in the object storage service. Also, it may be costly and time consuming to manage the additional higher performance hardware with regard to scaling, updates, network load balancing etc.

In some embodiments, in order to provide customers with accelerated access to a sub-set of objects stored in an object storage service, without requiring the customer to manage a separate storage solution, the object storage service may maintain an internal cache that is automatically managed by the object storage service in a way that is transparent to customers. For example, the object storage service may provide a common access interface for submitting requests, such as "get object" etc. The common interface may be configured to receive access requests for both accelerated access objects and non-accelerated access objects. Also, the difference between accelerated access objects and non-accelerated access objects (other than the lower latencies of access) may be transparent to client applications.

For example, a customer administrator may provide one or more acceleration configurations that define classes of objects for which accelerated access is to be provided. These objects may be referred to herein as accelerated access objects. As an example, a customer may define objects residing in a given bucket to be designated accelerated access objects. As another example, the customer may provide an acceleration configuration defining objects having a particular alpha-numeric string value in their object name as objects that are to be accelerated. For example, objects having "project A" included in their object name may be designated by a customer in an acceleration configuration file to be accelerated access objects. As yet another example, object prefixes may be used to define accelerated objects. In some embodiments, various other identifiers of classes of objects may be used to define accelerated objects. However, the acceleration configurations may not require changes to client applications of software development kits (SDKs). For example, from the perspective of the client application, an accelerated object and a non-accelerated object may be requested in the same way using the same interface. Also, the customer may not be required to reformat, re-name or otherwise modify existing objects in order to convert the existing objects into accelerated access objects. Instead, the customer may only be required to provide an acceleration configuration file that defines accelerated objects as including a characteristic of the existing (or yet to be created) objects, such as a string value, a prefix, a bucket in which the object is stored, etc. that encompasses those objects that the customer wishes to be provided accelerated access.

In some embodiments, an object storage system (e.g., a system that implements an object storage service as described herein) includes mass storage devices configured to store object data and object metadata for objects stored in the object storage system. For example, mass storage devices may include hard disk drives, or other suitable storage hardware. For a given object, the object metadata may include a version identifier for the given object and information indicating a storage location at which object data, for the given object having the version identifier, is stored on the mass storage devices. In some embodiments, object data may be stored as "blob" data that is immutable. Thus, when an object is updated, a new object data "blob" with the updates applied may be stored at a new location on the mass storage devices and may be assigned a new version identifier. The storage space storing the "blob" data of the previous version may then be released and made available to store object data for the same or different objects stored in the mass storage devices. In some embodiments, the version identifier included in the object metadata for an object that is stored on the mass storage devices of the object storage system may be the authoritative source of truth with regard to which version of the object is the current version.

The object storage system also includes additional storage devices configured to store cached copies of a subset of the objects stored in the object storage system. For example, the additional storage devices may be solid-state storage devices (SSDs) that provide a faster access time than the mass storage devices.

The object storage system may further include one or more computing devices that implements a cached object management service that manages which objects are to have cached copies stored in the additional storage devices. For example, accelerated objects may be eligible to have cached copies stored in a cache implemented using the additional (e.g., SSD) storage devices. The cached object management service, in response to a cache miss, may automatically store a cached copy of an accelerated access object in the cache implemented using the additional storage devices. In some embodiments, the cache may have a defined capacity and cached accelerated access objects that have not been recently accessed may be removed from the cache in order to free up cache space for other accelerated access objects that have been accessed more recently to be stored in the cache. For a given cached object, the cache implemented using the additional storage devices may store a cached copy of object data for the given cached object and a version identifier for the cached copy of the object data for the given cached object stored in the cache. In some embodiments, when an access request is received for an accelerated access object for which there is a cached copy of object data stored in the cache, the corresponding version identifier for the cached copy of the object data may be provided to a consistency verification service to ensure that the cached version has not been superseded. For example, the version identifier of the current version is authoritatively stored in the mass storage devices, and the consistency verification service may compare the cached version identifier to the version identifier of the object stored in the mass storage devices to verify the cached version is the current version.

Additionally, the object storage system may include one or more computing devices configured to implement an interface for receiving access requests for objects stored in the object storage system. This interface may be a common interface configured to receive access requests for both accelerated access objects and non-accelerated access objects that are stored in the object storage system. Also, in response to receiving an access request for a given object stored in the object storage system, the one or more computing devices are further configured to determine whether the object targeted by the given access request is an accelerated access object or a non-accelerated access object. For accelerated access objects, the one or more computing devices are configured to attempt to retrieve object data for the targeted object from the additional storage devices. Also, for non-accelerated access objects, the one or more computing devices are configured to retrieve the object data for the targeted object from the mass storage devices. Additionally, for accelerated access objects that do not have a cached copy stored in the cache, the one or more computing devices are configured to retrieve the object data for the accelerated object from the mass storage devices and asynchronously store a cached copy to the cache.

As one skilled in the art will appreciate in light of this disclosure, certain embodiments may be capable of achieving certain advantages, including some or all of the following: providing faster access speeds to a subset of objects stored in an object storage service, automatically managing cache population and eviction on behalf of customers, automatically managing storage for both cache storage and non-cache storage, including updates and auto-scaling on behalf of customers, and providing a common interface for requesting both accelerated access objects and non-accelerated access objects, wherein the common interface does not require any configuration changes with regard to routing or client applications. Also, various other advantages which will be apparent to those skilled in the art are provided.

Illustrative System Configuration

FIG. 1 illustrates a logical block diagram of an object storage service included in a service provider network, wherein the object storage service implements a fully managed cache for accelerated access objects and provides a common interface for accessing both accelerated and non-accelerated access objects, according to some embodiments.

Provider network 100 may include various data centers, each including computing hardware, storage devices, electrical infrastructure, mechanical infrastructure, etc. that provide cloud-based services, such as object storage service 102, virtualized computing service 150, other storage services 160, and other services 180.

In some embodiments, an object storage service that provides accelerated access objects and non-accelerated access objects, accessible via a common interface, such as object storage service 102 illustrated in FIG. 1, includes mass storage devices 104 and solid state storage devices 106, as well as one or more computing devices that implement access servers 108, control plane 112, control plane application programmatic interfaces (APIs) 114, consistency verification service 110, and common access interface 116.

In some embodiments, solid-state drives 106 may be local storage associated with access servers 108 or may be separate solid-state drives. As can be seen in FIG. 1 mass storage devices 104 store authoritative data and metadata for an object such as object data 120 and object metadata 122. Also, solid-state drives 106 store, for a subset of the objects stored in the object storage service 102, cached copies of object data 140 and cached copies of at least a portion of the object metadata for the cached objects stored in the solid-state drives 106 (e.g., cached copies of object metadata 142).

As further shown in FIGS. 2-8, an access request for both accelerated access objects and non-accelerated access objects may be received at a common access interface of an object storage service, such as common access interface 116 of object storage service 102. The common access interface 116 may route the request to a given access server 108. The access server 108 may then determine whether the object targeted by the request is an accelerated access object or a non-accelerated access object. If an accelerated access object, the access server 108 may attempt to retrieve a cached copy of object data for the object being targeted by the request from the solid-state drives 106, which may be local to the access server or local to another access server 108. The access servers 108 may also use consistency verification service 110 to verify that cached object data is the latest version of object data for an object. For example, consistency verification service 110 may be used to verify that a version identifier associated with a cached copy of object data matches a current version identifier of an object stored in the mass storage devices 104. If so, the cached copy may be verified. If the version identifiers do not match, the cached copy may be considered stale and not returned, in which case the access request to the solid-state drives 106 will be treated as a cache miss.

It is noted that where one or more instances of a given component may exist, reference to that component herein may be made in either the singular or the plural. However, usage of either form is not intended to preclude the other. In various embodiments, the components of an object storage service, such as access servers 108, may be implemented directly within computer hardware, as instructions directly or indirectly executable by computer hardware (e.g., a microprocessor or computer system), or using a combination of these techniques. For example, the components of object storage service 102 may be implemented by a distributed system including a number of computing nodes (or simply, nodes), such as the computer node embodiment illustrated in FIG. 9. In various embodiments, the functionality of a given storage service system component may be implemented by a particular computing node or may be distributed across several computing nodes. In some embodiments, a given computing node may implement the functionality of more than one storage service system component.

Generally speaking, storage service customers, such as customers 192, may encompass any type of customer configurable to submit web services requests to object storage service 102 via a network, such as network 190. For example, a given storage service client may include a suitable version of a web browser, or a plugin module or other type of code module configured to execute as an extension to or within an execution environment provided by a web browser to provide storage service clients (e.g., client applications, users, and/or subscribers) access to the data storage services provided by object storage service 102. Alternatively, a storage service client may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, a storage service client may be an application configured to interact directly with object storage service 102. In various embodiments, a storage service client may be configured to generate web services requests according to a Representational State Transfer (REST)-style web services architecture, a document- or message-based web services architecture, or another suitable web services architecture.

Generally speaking, common access interface 116 may be configured to implement one or more service endpoints configured to receive and process web services requests, such as requests to access objects maintained on behalf of clients/customers by a data storage service. For example, common access interface 116 may include hardware and/or software configured to implement various service endpoints and to properly receive and process HTTP-based web services requests directed to those endpoints. In one embodiment, access servers 108 may be implemented as server systems configured to receive web services requests from clients via a client interface and to forward them to various components that collectively implement a data storage system for processing.

In addition to functioning as an addressable endpoint for clients' web services requests, in some embodiments, access servers 108 and control plane APIs 114 may implement various client management features. For example, access servers 108 may coordinate the metering and accounting of client usage of web services, including storage resources, such as by tracking the identities of requesting clients, the number and/or frequency of client requests, the size of objects and/or other items stored or retrieved on behalf of clients, overall storage bandwidth used by clients, class of storage requested by clients, and/or any other measurable client usage parameter.

Where certain object-based storage node components are implemented as discrete applications or executable processes, they may communicate with one another using standard inter-process communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating components. For example, in one object-based storage node system embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among object-based storage node system components may be implemented using protocols at higher layers of protocol abstraction.

In some embodiments, control plane APIs 114 may enable customers 192 to define acceleration configurations for objects and/or buckets. For example, a customer may define particular buckets to be buckets that store accelerated objects, while other buckets remain non-accelerated. Also, for a given bucket, a customer may specify definitions for objects within the bucket that are to be accelerated. For example, accelerated objects may be defined by (1) "a prefix", (2) an alphanumeric string included in a name (or other metadata) for an object, (3) a tag associated with the object, (4) a flag included in a request for the object, such as a marker included in a header of an access request message, as a few examples.

Figure 2:
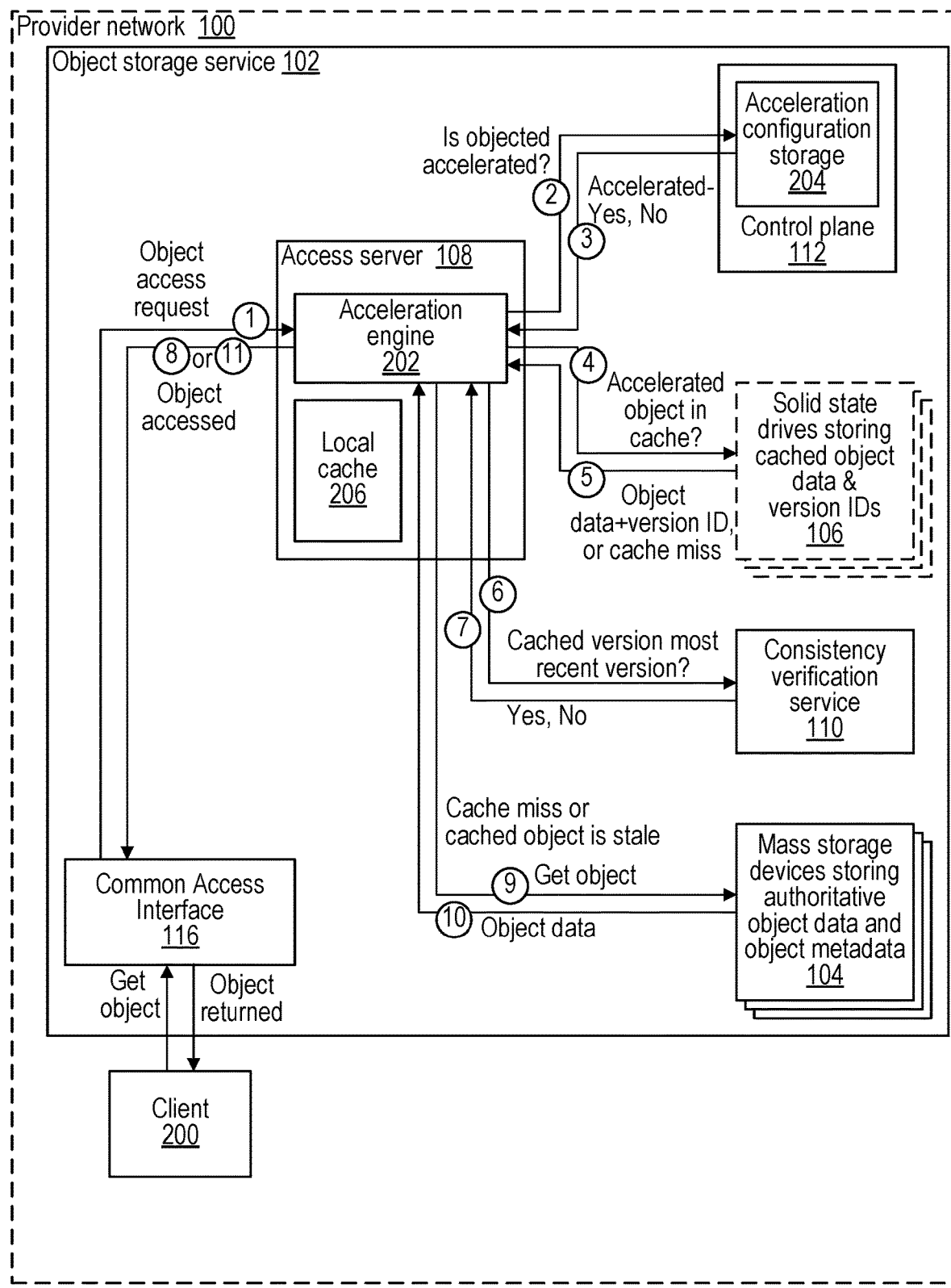
FIG. 2 is a logical block diagram illustrating operations performed by an access server of an object storage service in response to receiving an access request for an object at a common access interface of the object storage service, according to some embodiments.

FIG. 2 is a logical block diagram illustrating operations performed by an access server of an object storage service in response to receiving an access request for an object at a common access interface of the object storage service, according to some embodiments.

A client, such as client 200, may submit an object access request, such as s "get object" request to a common access interface 116 of object storage service 102. In some embodiments, the client may be an application executing in another service of the service provider network 100, such as an application implemented using virtualized computing resources of virtualized computing service 150, or an application implemented using resources of other services 180, such as a client application implemented using a code execution service, a machine learning service, a data analytics service, or various other types of services that may need to access object data for objects stored in object storage service 102.

Figure 3:
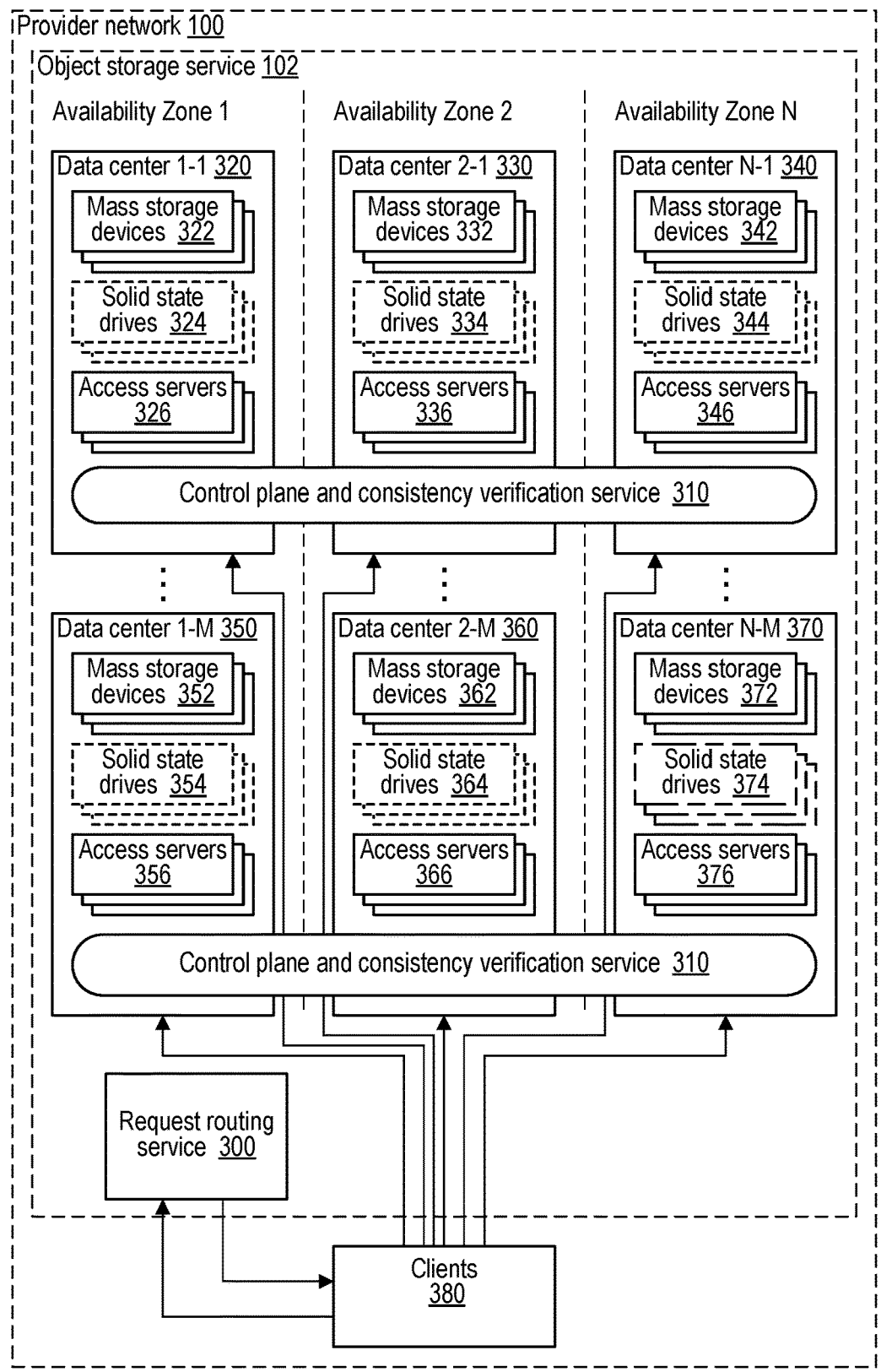
FIG. 3 is a logical block diagram illustrating an object storage service implemented using storage resources included in multiple data centers in multiple availability zones of a service provider network, according to some embodiments.

For example, at (1) the common access interface 116 sends an object access request to access server 108. In some embodiments, each availability zone of object storage service 102 may have its own access interface 116. For example, a multi-availability zone configuration is shown in FIG. 3. Within a given availability zone, there may be multiple access servers 108, located in one or more data centers of the availability zone. In some embodiments, common access interface 116 may forward a request to a network load balancer for the access servers 108, and the network load balancer may select an access server to receive the object access request, for example based on respective loadings of the access servers.

Access server 108 may implement an acceleration engine 202 and may further include a local cache 206 storing cached copies of object data and/or object metadata. For example, while not shown in FIG. 2, access server 108 may further include an object assembler that assembles objects from shards stored either in mass storage devices or cache. In some embodiments, object data shards and object metadata may be stored in local cache 206, for example during the object re-assembly process.

If the object data needed to assemble the requested object is not already stored in the local cache 206, at (2) the acceleration engine 202 may retrieve an acceleration configuration for the object and/or an acceleration configuration for a bucket to which the object belongs. For example, control plane 112 may provide acceleration configuration files from acceleration configuration storage 204, these acceleration configuration files may be used to determine an acceleration status (e.g., accelerated or non-accelerated) for an object that is targeted by an access request.

If the object is a non-accelerated object, the object data may be retrieved from the mass storage devices 104. However, if the object is an accelerated object (based on the acceleration configuration for the object or for the bucket to which the object belongs), as determined at (3), accelerated access may be provided by retrieving object metadata from a cache implemented using solid-state drives 106.

At (4), for accelerated objects, the acceleration engine 202 may attempt to retrieve object data for the object targeted by the access request from solid-state drives 106. The solid-state drives may also store at least a portion of the metadata for the copied object data stored in the cache. For example, when object data for an object is copied to the cache, an associated version identifier for the object data at the time of being copied to the cache may be stored with the object data in the cache as associated object metadata.

At (5) either the object data or an indication of a cache miss is returned to the acceleration engine 202. The returned object data stored in the cache may also be returned with an associated version identifier. At (6) the acceleration engine may use consistency verification service 110 to determine at whether the version identifier associated with the cached object data matches a current version identifier for the object targeted by the object access request. A verification response may be received at (7). If the version of the cached object data is verified to be the current version for the object, at (8) the access server may assemble and return the requested object to the common access interface 116. The common access interface 116 may further provide the returned object to client 200. However, if the object data for the targeted object was not stored in the solid-state drives 106 (e.g., a cache miss) or if the object data stored in the cache is stale (e.g., version identifier of cached object data does not match current version identifier for the targeted object), then the object data may be retrieved at (9) from the mass storage devices 104 and returned at (10) to the acceleration engine 202. The object data, either returned from mass storage devices 104 or solid-state storage devices 106, may temporally be stored in local cache 206, such as during assembly of an object from a set of shards. At (11) the requested object may then be returned to common access interface 116 for provision to client 200.

In some embodiments, in response to a cache miss for an accelerated object, the acceleration engine (or other component of the object storage service 102) may asynchronously populate the cache implemented using solid-state drives 106 to include the accelerated object that was not stored in cache, e.g., resulting in the cache miss. Also, a version identifier of the current version of the object data being copied into the cache is stored in the solid-state drives 106 along with the object data for the object being added to the cache.

FIG. 3 is a logical block diagram illustrating an object storage service implemented using storage resources included in multiple data centers in multiple availability zones of a service provider network, according to some embodiments.

In some embodiments, object storage service 102 may be implemented across multiple availability zones of provider network 100, and each availability zone may include one or more data centers. For example, availability zone 1 includes data centers 1 through M, such as data center 320 and 350. Each data center includes mass storage devices, solid-state drives, and access servers, such as those shown in FIGS. 1 and 2. For example, data center 320 includes mass storage devices 322, solid-state drives 324, and access servers 326. Also, data center 350 includes mass storage devices 352, solid-state drives 354, and access servers 356. In a similar manner availability zone 2 includes data centers 1 through M, such as data center 330 and 360. Also, data center 330 includes mass storage devices 332, solid-state drives 334, and access servers 336. Also, data center 360 includes mass storage devices 362, solid-state drives 364, and access servers 366. Likewise, availability zone N includes data centers 1 through M, such as data center 340 and 370. Also, data center 340 includes mass storage devices 342, solid-state drives 344, and access servers 346. Also, data center 370 includes mass storage devices 372, solid-state drives 374, and access servers 376.

While not shown, each availability zone 1-through N also includes its own common access interface, such as common access interface 116 shown in FIGS. 1 and 2. Also, a separate cache (that is separately populated) may be implemented on the solid-state drives of each of the availability zones. Thus, depending on cache misses, each cache of the respective availability zones may be populated differently. For example, clients accessing data objects in a first availability zone may request access to different objects than clients in a different availability zone. Thus, the caches of the respective availability zones may be configured (based on cache misses) to store copies of the objects most likely to be requested by clients of the given availability zone.

Also, in some embodiments, a common control plane and consistency verification service, such as may be implemented by control plane 310, is available in each of the availability zones.

In some embodiments, clients 380 may include clients implemented on computing resources of any of availability zones 1 through N of provider network 100. For example, clients 380 may be implemented on virtualized computing resources, for example of virtualized computing service 150 or other services 180, that include computing resource hosts in any of availability zones 1 through N.

In some embodiments, in order to process access requests from clients 380, a routing request may be sent to request routing service 300 which may select a given availability zone (and corresponding access interface 116) that the access requests are to be routed to. In some embodiments, an availability zone may be selected based on proximity to clients 380. For example, clients implemented on computing resources in a given availability zone may have their access requests routed to an access interface of the same availability zone. Once an availability zone is selected for access requests from a given client 380, subsequent requests from the same client may be routed to the same availability zone access interface. In this way, a corresponding cache of the availability zone may be custom populated with object data for objects most likely to be accessed by clients whose routing requests are routed to the respective availability zone. In some embodiments, an initial selection of availability zone (and corresponding access interface) to be selected to service requests from a given client may further be based on load-balancing considerations. For example, if some availability zones are more loaded than others, initial requests from clients may be routed to an availability zone with less load. Thus, in some embodiments both load and proximity may be used to select an availability zone routing assignment for a client. However, once selected, subsequent requests may be routed to the same availability zone, at least for a period of time, such as a session.

If a selected availability zone access interface becomes unavailable, the request routing service 300 may select an alternative availability zone (and corresponding access interface) assignment. Subsequent requests may be routed to the alternative availability zone, at least as long as the primary availability zone access interface remains unavailable.

Figure 4:
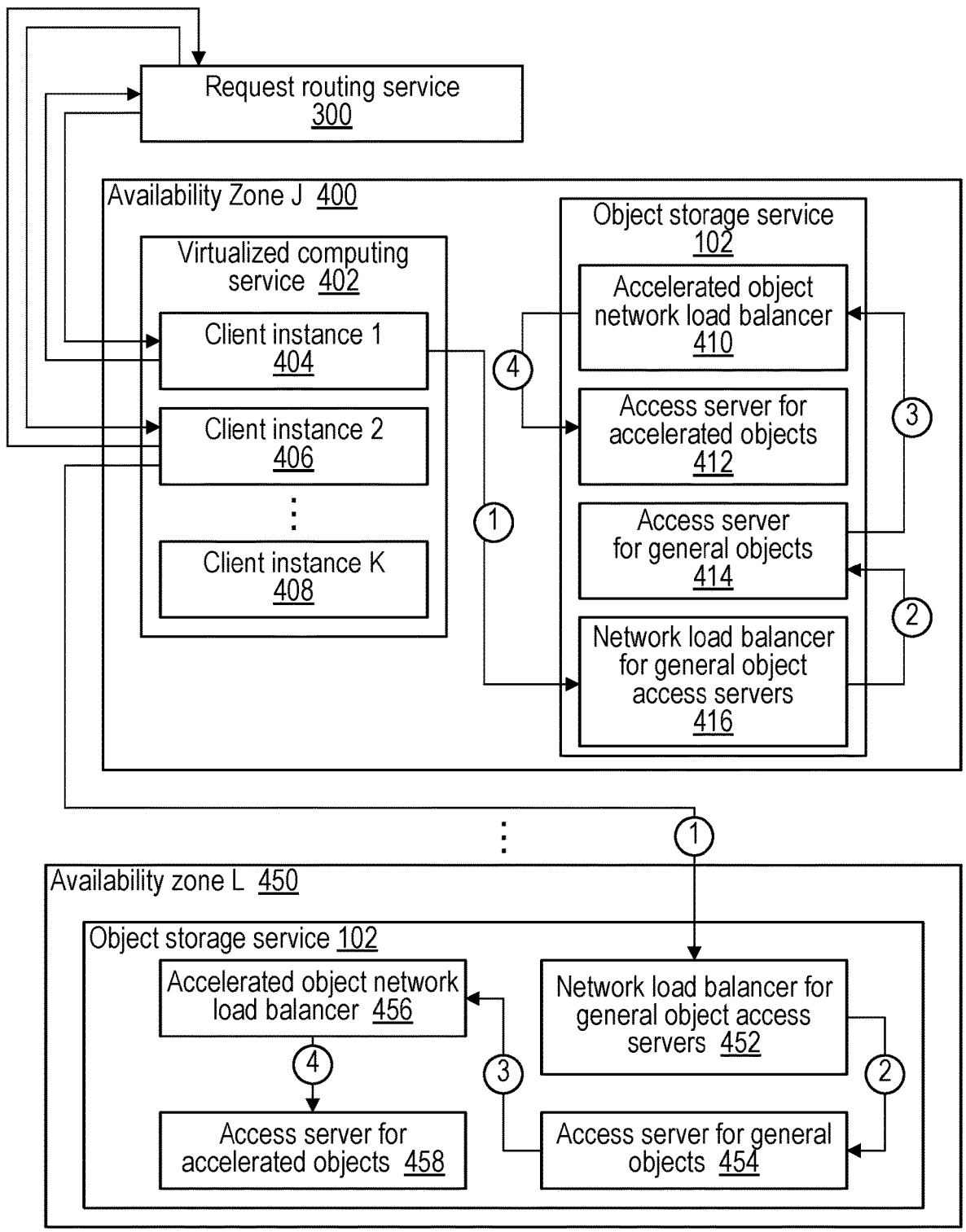
FIG. 4 is a logical block diagram illustrating operations performed by a request routing service and other components of an object storage service, wherein the object storage service is implemented in multiple availability zones of a service provider network, according to some embodiments.

FIG. 4 is a logical block diagram illustrating operations performed by a request routing service and other components of an object storage service, wherein the object storage service is implemented in multiple availability zones of a service provider network, according to some embodiments.

As an example, availability zone J (400) may include client instances 404, 406, and 408 of virtualized computing service 402 and may also implement a portion of object storage service 102. Additionally, another portion of object storage service 102 may be implemented in availability zone L (450). Client instance 404 may request routing information for an access request from routing service 300 and may be returned a route to one or more network load balancers for an access interface for availability zone J (400). Then at (1) client instance 404 may route an access request to the network load balancers 416 for the general object access server of availability zone J (400) using the route provided by request routing service 300. The load balancers 416 may then (at 2) route the access request to a given access server for general objects 414, which may be one of a fleet of access servers for general objects included in availability zone 400. If the object targeted by the request is an accelerated access object, at (3) the request may be routed to an accelerated access object network load balancer 410, which may select a given access server for accelerated objects and route (at 4) the access request to the selected access server for accelerated objects 412.

In a similar manner client instance 406 may request a route for an access request from request routing service 300 and may be returned a route to an access interface for availability zone L (450). For example, the access interface for availability zone J (400) may be unavailable, or if the access request is a first access request from client 406, availability zone L (450) may be selected to load balance between availability zone J (400) and availability zone L (450). Once availability zone L (450) is selected for servicing object access requests from client instance 406, subsequent access requests from client instance 406 may be routed to the same access interface (e.g., the access interface for availability zone L (450). Also, within availability zone L (450), a similar routing flow may be followed as described above for availability zone J (400). For example, at (1) an access request is routed to network load balancer 452 for general object access servers, which selects an access server and at (2) routes the access request to a selected one of the access servers for general objects 454. If it is determined that the object targeted by the access request is an accelerated access object, then at (3) the access request is forwarded on to accelerated object network load balancer 456, which selects an access server for accelerated objects, such as access server 458, and at (4) routes the access request to access server for accelerated objects 458.

Figure 5:
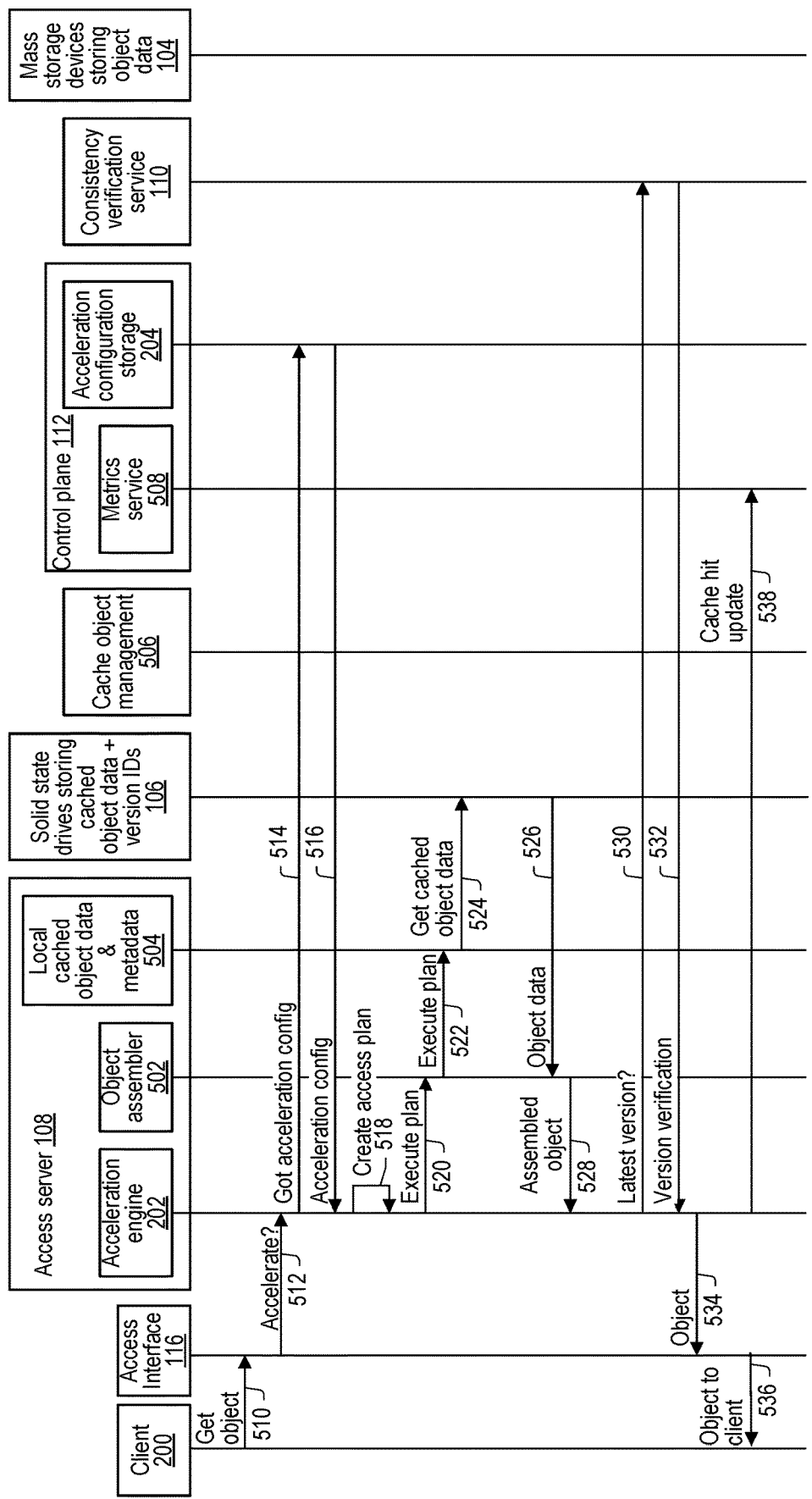
FIG. 5 is a logical flow diagram illustrating interactions between various components of an object storage service in response to receiving an access request at a common interface of the object storage service, wherein the access request targets an accelerated access object having a cached copy stored using higher performance storage resources, according to some embodiments.

FIG. 5 is a logical flow diagram illustrating interactions between various components of an object storage service in response to receiving an access request at a common interface of the object storage service, wherein the access request targets an accelerated access object having a cached copy stored using higher performance storage resources, according to some embodiments.

At 510 client 200 sends an access request requesting access to an object stored in an object storage service to an access interface 116 of the object storage service. The access interface 200 is configured to receive access requests for both accelerated access objects and regular access (e.g., non-accelerated access) objects. The regular access objects have object data stored in mass storage devices 104. The accelerated access objects have object data stored in mass storage devices 104 and additionally are eligible to have cached copies of the object data stored in higher performance storage resources, such as solid-state drives 106.

At 512, the access interface 116 routes the access request to an access server 108. For example, the access interface may select an access server in a same availability zone as the access interface 116. At 514, acceleration engine 202 of access server 108 requests an acceleration configuration for the object or for a bucket to which the object belongs and at 516 acceleration configuration store 204 returns information indicating the acceleration configuration applicable to the requested object. At 518, the acceleration engine 202 creates an access plan for access object data for the requested object based on the acceleration configuration applicable for the requested object. In some embodiments, object data may be sharded and stored as a set of erasure encoded shards. Thus, the access plan may include determining which shards are needed and where the needed shards are stored, for example on the mass storage devices 104. In some embodiments, object data stored in solid state drives 106 may be stored as a full set of object data (e.g., not sharded). For example, since cached object data is copied from object data stored in mass storage devices 104, a loss of cached object data does not affect data durability. Instead, a loss of cached object data may only result in a cache miss. For this reason, it may not be necessary to redundantly store cached object data copies, in some embodiments.

Figure 6:
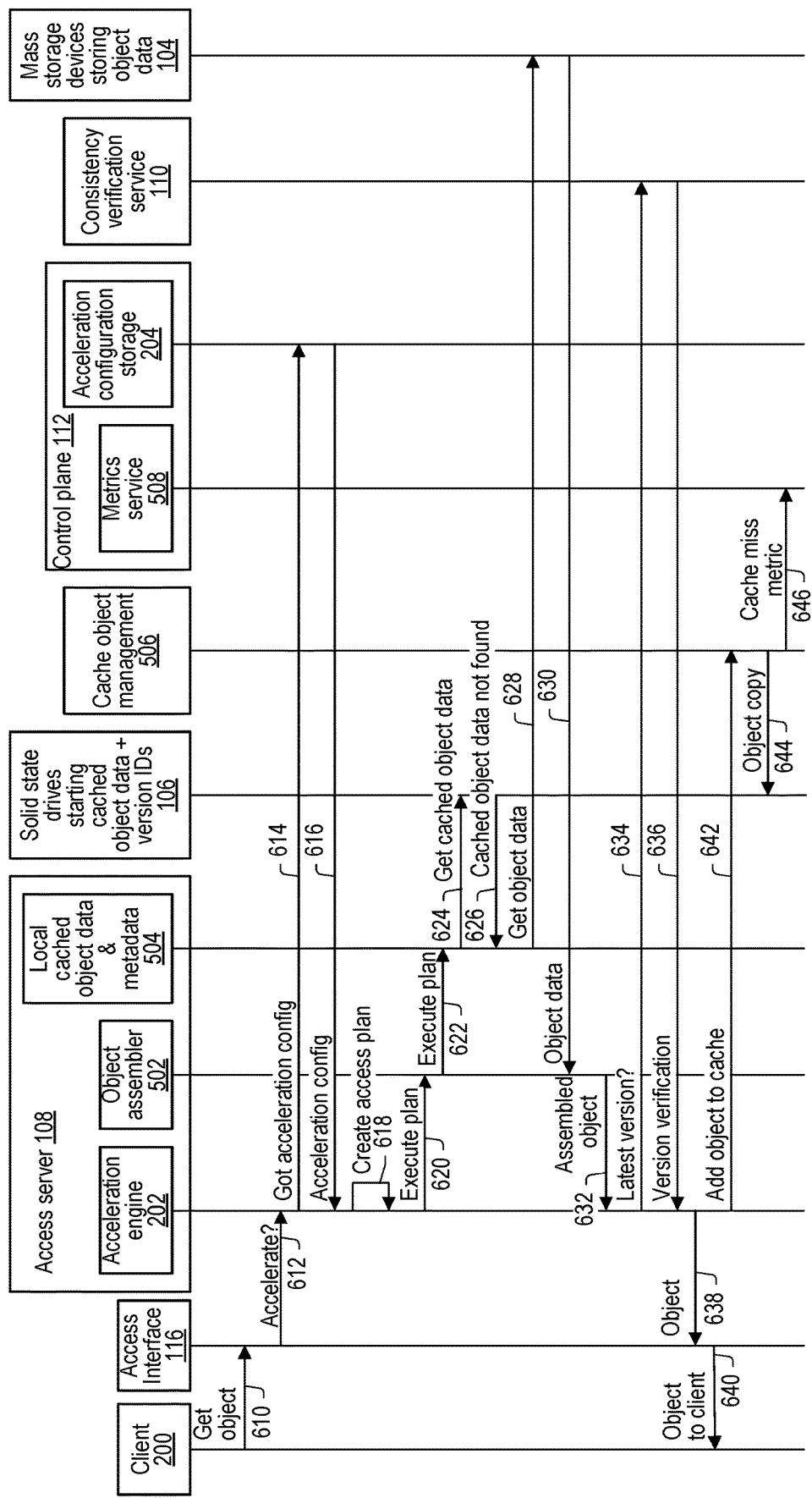
FIG. 6 is a logical flow diagram illustrating interactions between various components of an object storage service in response to receiving an access request at a common interface of the object storage service, wherein the access request targets an accelerated access object that is not currently stored in cache, according to some embodiments.

At 520, the object assembler 502 provides the generated execution plan to object assembler 502. The object assembler 502 assembles object (e.g., using shards of object data) from object data stored in local cached object data and object metadata 504. At 522, the object assembler looks to the local cache 504 for object data and metadata needed to assemble the requested object. The access server 108 then at 524 (if the object data is not already locally cached at the access server 108) attempts to retrieve the object data from solid state drives 106. If there is a cache hit, at 526 the solid-state drives 106 return the requested object data. If there is a cache miss, a process as shown in FIG. 6 is performed. The object assembler 502 then assembles the requested object and at 528 provides an assembled current version of the requested object to acceleration engine 202. At 530, the acceleration engine 202 consults with the consistency verification service 110 to determine whether or not the returned assembled object, assembled using cached object data and cached object metadata has a version identifier matching a current version of the requested object. At 532 the consistency verification service 110 returns a consistency verification result. If the version is a match, at 534 the acceleration engine forwards the verified assembled object to access interface 116. If the verification fails, then the assembled object is disregarded and the acceleration engine proceeds as if it were a cache miss, which is described in FIG. 6. At 538, the acceleration engine 202 also provides a metric update indicating a cache hit (if applicable) or a cache miss to the metrics service 508 of control plane 112.

FIG. 6 is a logical flow diagram illustrating interactions between various components of an object storage service in response to receiving an access request at a common interface of the object storage service, wherein the access request targets an accelerated access object that is not currently stored in cache, according to some embodiments.

Steps 610 through 624 are similar to steps 510 through 524 described in FIG. 5. However, at 626 a cache miss may be indicated, e.g., solid-state drives 106 may indicate that object data for the requested object was not found stored on the solid-state drives. In response to the cache miss, at 628, access server 108 may request object data from mass storage devices 104. In response, erasure encoded shards of object data may be returned at 630. Object assembler 502 may then assemble the requested object using the object data returned from the mass storage devices 104 and at 632 provide an assembled version of the requested object to acceleration engine 202. At 634 the acceleration engine 202 may consult with the consistency verification service 110 to determine whether the assembled object is a current version of the requested object. At 636 the acceleration engine 202 receives information indicating the version verification. Then, assuming the verification passes, at 638, the acceleration engine 202 of the access server 108 provides the assembled verified object to the access interface 116. Then at 640, the access interface 116 forwards the assembled and verified object on to client 200. Additionally, at 642 the acceleration engine 202 asynchronously instructs the cache object management to add the accelerated object that was a "cache miss" to the cache. At 644, the cache object management 506 copes object data for the object to the solid-state drives 106 and at 646 provides a metric indicating a cache miss and/or cache addition with regard to the object to the metrics service 508.

Figure 7:
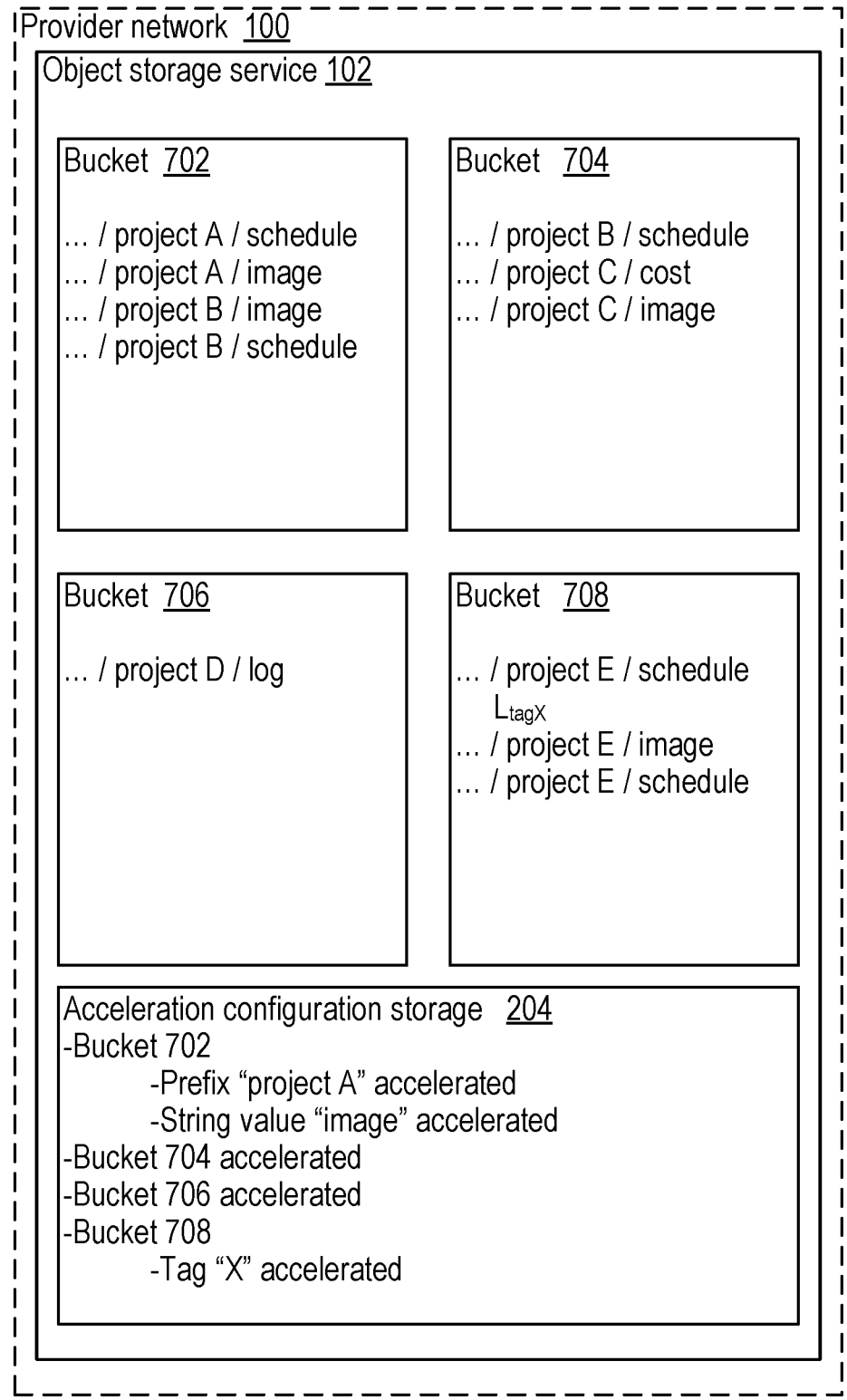
FIG. 7 is a logical block diagram illustrating buckets of an object storage service, wherein objects stored in the buckets have object names comprising an alphanumeric string value and may further include tags.

FIG. 7 is a logical block diagram illustrating buckets of an object storage service, wherein objects stored in the buckets have object names comprising an alphanumeric string value and may further include tags. FIG. 7 further illustrates example acceleration configurations that may be applied to buckets, or to objects, residing in particular buckets and/or having particular prefixes, tags, or other identifying elements, according to some embodiments.

In some embodiments, acceleration configurations may define buckets for which objects are to be accelerated and/or may more narrowly define only some objects of a given bucket that are to be accelerated. For example, object storage service 102 may include different buckets, such as buckets 702, 704, 706, and 708, as shown in FIG. 7. Each bucket may have a different acceleration configuration and may also store objects having different characteristics, such as prefixes, string values (either in the object name or other metadata), or other identifiers, such as object tags.

As a few examples, an acceleration configuration for bucket 704 may indicate that all objects stored in bucket 704 are to be provided accelerated access. A similar acceleration configuration may be stored for bucket 706 in acceleration configuration storage 204. For bucket 702, an acceleration configuration may specify that only objects having a specified prefix or string value such as "project A" or "image" are to be accelerated, while other objects such as the project B schedule remain un-accelerated and are provided standard access. As another example, tags may be used to specify objects to be accelerated. For example, the project E schedule stored in bucket 708 may be accelerated based on a tag value.

Additionally, in some embodiments, a customer may include a flag or other indicator in an object access request, such as in a header of the request. In such embodiments, the access interface 116 may mark the object for accelerated access based on the flag.

Figure 8:
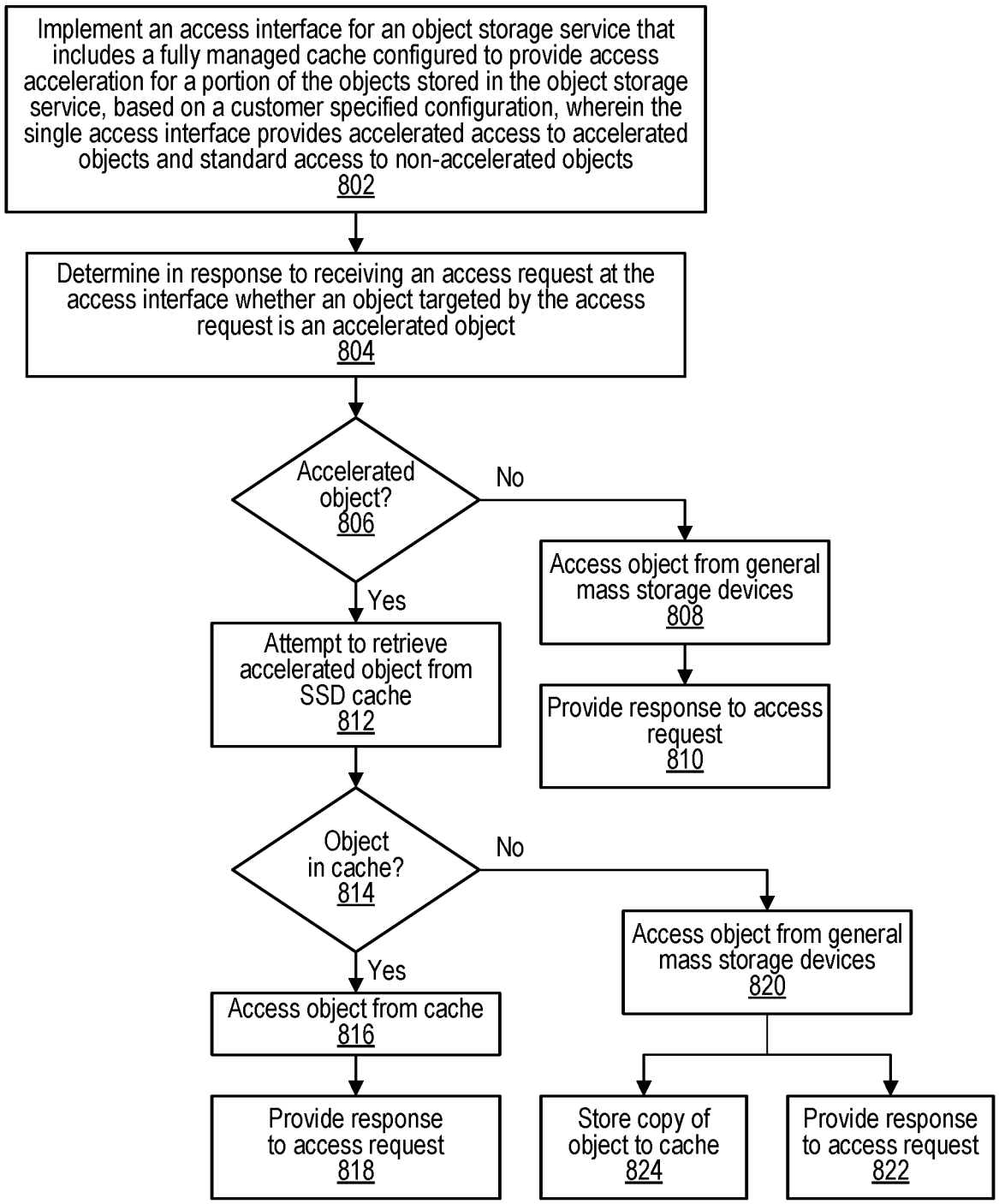
FIG. 8 is a process flow diagram illustrating a process for providing access to objects stored in an object storage service using a common interface of an object storage service that supports access to both accelerated and non-accelerated access objects, according to some embodiments.

FIG. 8 is a process flow diagram illustrating a process for providing access to objects stored in an object storage service using a common interface of an object storage service that supports access to both accelerated and non-accelerated access objects, according to some embodiments.

At block 802, an object storage service implements an access interface that includes a fully managed cache configured to provide access acceleration for a portion of the objects stored in the object storage service. Which objects are to be provided accelerated access is determined based on a customer specified configuration or a default acceleration configuration. The single access interface provides accelerated access to accelerated objects and standard access to non-accelerated objects.

At blocks 804 and 806, the object storage service determines, in response to receiving an access request at the access interface whether an object targeted by the access request is an accelerated access object. If the object is not an accelerated access object, the object data for the object is accessed from general mass storage devices at block 808 and provided in response to the access request at block 810.

If the object is determined to be an accelerated access object, then at block 812, an attempt to retrieve the object data for the object from the solid-state drive cache is made. At block 814 it is determined whether up-to-date object data for the accelerated object is stored in the cache. If so, at block 816, the accelerated object is accessed using the object data stored in the cache and at block 818 a response including the accelerated access object is returned to the requestor.

If the object is an accelerated access object but not stored in cache, at block 820 the object data for the object is accessed from the general mass storage devices of the object storage service. Then at block 822, the requested object is provided to the requestor and, asynchronously, at block 824 a copy of the object data for the object is added to the cache. Note that all of the steps described in FIG. 8 are automatically performed by the object storage service in response to receiving a generic access request at a common access interface 116. The client and customer are not required to manage the cache or to populate the cache and may continue to submit access requests in a generic format used for other object storage systems that do not support accelerated access objects. Thus, the customer is not required to reconfigure client applications or SDKs in order to receive accelerated access.

Illustrative Computer System

Figure 9:
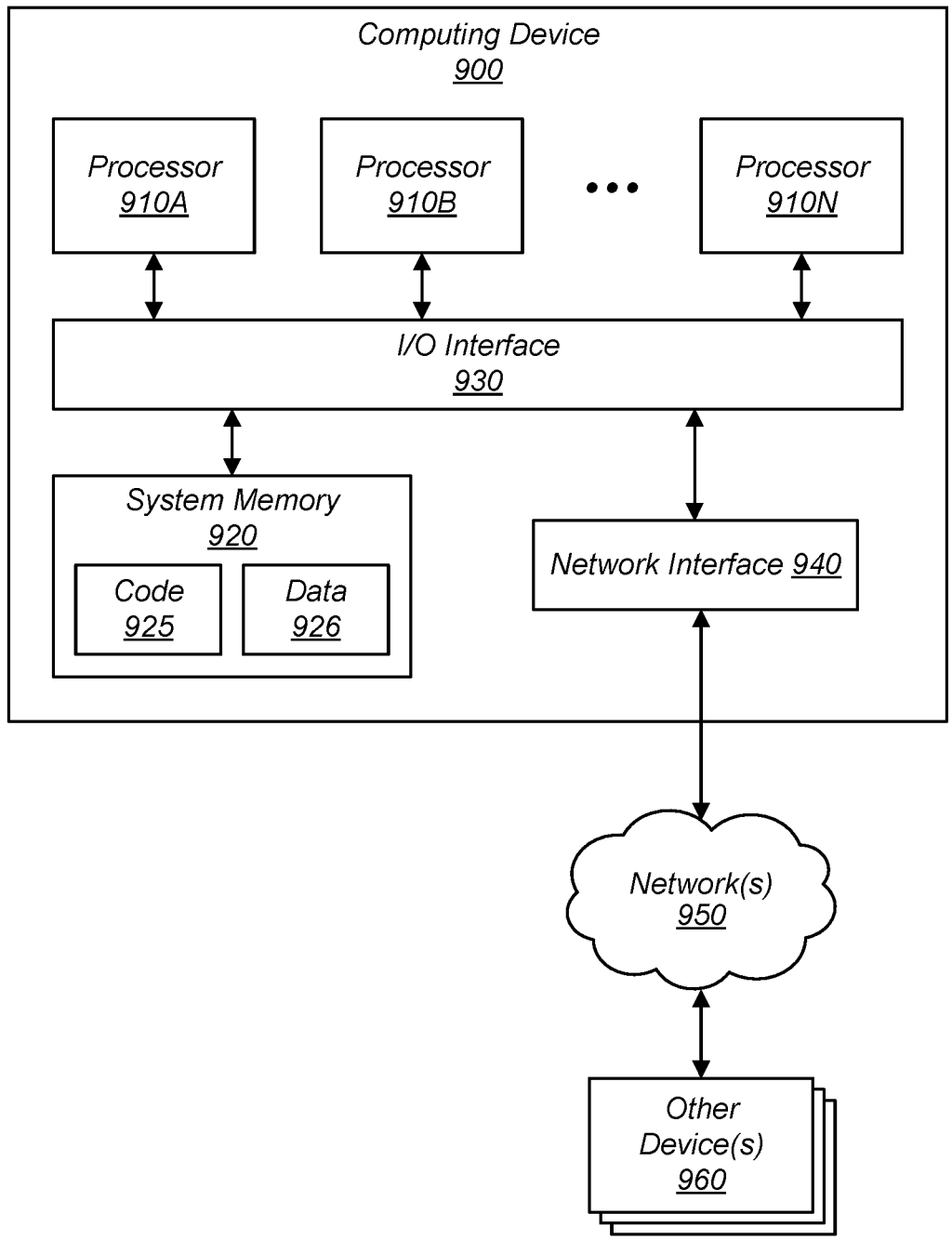
FIG. 9 illustrates an example computing device that may be used in some embodiments.

In at least some embodiments, a computer system that implements a portion or all of one or more of the technologies described herein may include a computer system that includes or is configured to access one or more computer-readable media. FIG. 9 illustrates such a computing device 900. In the illustrated embodiment, computing device 900 includes one or more processors 910A-910N coupled to a system memory 920 via an input/output (I/O) interface 930. Computing device 900 further includes a network interface 940 coupled to I/O interface 930.

In various embodiments, computing device 900 may be a uniprocessor system including one processor or a multiprocessor system including several processors 910A-910N (e.g., two, four, eight, or another suitable number). Processors 910A-910N may include any suitable processors capable of executing instructions. For example, in various embodiments, processors 910A-910N may be processors implementing any of a variety of instruction set architectures (ISAs), such as the x86, PowerPC, ARM, or MIPS ISAs, or any other suitable ISA. In multiprocessor systems, each of processors 910A-910N may commonly, but not necessarily, implement the same ISA.

System memory 920 may be configured to store program instructions and data accessible by processor(s) 910A-910N. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code (i.e., program instructions) 925 and data 926.

In one embodiment, I/O interface 930 may be configured to coordinate I/O traffic between processors 910A-910N, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 1710). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processors 910A-910N.

Network interface 940 may be configured to allow data to be exchanged between computing device 900 and other devices 960 attached to a network or networks 950. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 900 via I/O interface 930. One or more non-transitory computer-readable storage media may also include any volatile or non-volatile media such as RAM (e.g., SDRAM, DDR SDRAM, RDRAM, SRAM, etc.), ROM, etc., that may be included in some embodiments of computing device 1700 as system memory 920 or another type of memory. Further, a computer-readable medium may include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An object storage system, comprising:
   mass storage devices configured to store object data and object metadata for objects stored in the object storage system,
   wherein, for a given object, the object metadata comprises:

a version identifier for the given object; and
information indicating a storage location at which object data, for the given object having the version identifier, is stored on the mass storage devices;
additional storage devices configured to store cached copies of a subset of the objects stored in the object storage system,
wherein, for a given cached object, the additional storage devices store:
a cached copy of the object data for the given cached object; and
a version identifier for the cached copy of the object data for the given cached object; and
one or more computing devices configured to:
implement an interface for receiving access requests for objects stored in the object storage system, wherein the interface is configured to:
receive an access request for an accelerated access object stored in the object storage system and
receive an access request for a non-accelerated access object stored in the object storage system;
determine, in response to receiving a given access request at the interface, whether an object targeted by the given access request is an accelerated access object or a non-accelerated access object; and
in response to determining the object targeted by the given access request is an accelerated access object, attempt to retrieve object data for the targeted object from the additional storage devices; or
in response to determining the object targeted by the given access request is a non-accelerated access object, retrieve the object data for the targeted object from the mass storage devices.

2. The object storage system of claim 1, wherein the additional storage devices comprise solid-state drives (SSDs).

3. The object storage system of claim 1, wherein the object storage service is configured to automatically populate the additional storage devices with cached copies of objects, wherein to perform said automatically populating the additional storage devices with the cached copies of the objects, the one or more computing devices are further configured to:
for an accelerated access object targeted by an access request, in response to a failed attempt to retrieve the accelerated access object from the additional storage devices:
retrieve object data for the targeted accelerated access object from the mass storage devices;
return the retrieved object data in a response to the access request targeting the accelerated access object; and
asynchronously store in the additional storage devices a cached copy of the object data for the targeted accelerated access object and a cached copy of the version identifier corresponding to the cached copy of the object data for the targeted accelerated access object.

4. The object storage system of claim 1, further comprising:
a plurality of availability zones, each comprising:
respective ones of the mass storage devices;
respective ones of the additional storage devices; and
respective ones of the one or more computing devices, wherein the respective ones of the one or more computing devices implement respective access interfaces for the respective ones of the availability zones,
wherein:
each availability zone comprises a separate cache implemented using the respective set of the additional storage devices of the respective availability zone, and
the respective caches of the respective availability zones are separately populated based on access requests received at the respective access interfaces of the respective availability zones.

5. The object storage system of claim 4, further comprising:
a request routing service configured to:
receive access requests from clients of the object storage system and select respective ones of the access interfaces of the respective availability zones to route the access request to, wherein the access interfaces are selected based on proximity of a requesting client to a given one of the respective availability zones.

6. The object storage system of claim 5, wherein the request routing service is further configured to:
determine a given one of the availability zones is unavailable to process an access request from a given client proximate to the given availability zone and select a replacement availability zone to process the access request from the given client, wherein subsequent access requests received from the given client are routed to the replacement availability zone, while the given availability zone remains unavailable.

7. One or more non-transitory, computer-readable, storage media storing program instructions that, when executed on or across one or more processors, cause the one or more processors to:
implement an interface for receiving access requests for objects stored in an object storage service, wherein the interface is configured to:
receive an access request for an accelerated access object stored in the object storage service and
receive an access request for a non-accelerated access object stored in the object storage service;
determine, in response to receiving a given access request at the interface, whether an object targeted by the given access request is an accelerated access object or a non-accelerated access object; and
in response to determining the object targeted by the given access request is a non-accelerated access object:
retrieve object data for the targeted object from storage devices of the object storage service, the storage devices having a first access performance level, wherein the storage devices store:
a version identifier for the targeted object; and
information indicating a storage location at which the object data, for the targeted object having the version identifier, is stored on the storage devices having the first access performance level; or
in response to determining the object targeted by the given access request is an accelerated access object:
attempt to retrieve the object data for the targeted object from additional storage devices of the object storage service, the additional storage devices having a second access performance level, wherein the additional storage devices store:
a cached copy of the object data for the targeted object; and a version identifier for the cached copy of the object data for the targeted object.

8. The one or more non-transitory, computer-readable, storage media of claim 7, storing additional program instructions that, when executed on or across the one or more processors, cause the one or more processor to implement a request routing service configured to:
receive access requests from clients of the object storage service; and
select respective ones of a plurality of respective access interfaces of respective availability zones to route the access requests to, wherein the access interfaces are selected based on proximity of a requesting client to a given one of the respective availability zones, and wherein each availability zone comprises a separately populated cache.

9. The one or more non-transitory, computer-readable, storage media of claim 8, wherein the request routing service is further configured to:
determine a given one of the availability zones is unavailable; and
select a replacement availability zone to process access requests, wherein subsequent access requests received from a same given client are routed to the same replacement availability zone, while the given availability zone remains unavailable.

10. The one or more non-transitory, computer-readable, storage media of claim 7, storing additional program instructions that, when executed on or across the one or more processors, cause the one or more processor to implement a consistency verification application programmatic interface (API) configured to:
receive an indication of the version identifier for the cached copy of the object data stored in the storage devices, having the second performance level, for the object targeted by the given access request;
determine whether the version identifier for the cached copy matches the version identifier for the object targeted by the request that is stored in the storage devices having the first performance level; and
provide, based on the determination, an indication of whether the cached copy of the object data is a valid copy of a current version of the object data for the object targeted by the given access request.

11. The one or more non-transitory, computer-readable, storage media of claim 7, wherein the storage devices having the first performance level store for respective objects stored in the object storage service:
a current version identifier for current object data for the respective object stored in the object storage service; and
information indicating a storage location on the storage devices having the first performance level at which the current object data for the respective object having the current version identifier is stored.

12. The one or more non-transitory, computer-readable, storage media of claim 11, wherein:
the object data stored for the objects stored in the object storage service is immutably stored on the storge devices having the first performance level and,
in response to a mutating request,
object data for a given object targeted by the mutating request is replaced with an updated instance of object data for the object targeted by the mutating request; and an updated version identifier associated with the updated instance of the object data is provided for the object targeted by the mutating request.

13. The one or more non-transitory, computer-readable, storage media of claim 7, storing additional program instructions that, when executed on or across the one or more processors, cause the one or more processor to implement a control plane for the object storage service, the control plane configured to:
receive a request for access acceleration defining a class of objects stored in the object stored service for which accelerated access is to be provided; and
perform on or more configuration changes to implement accelerated access for the defined class of objects.

14. The one or more non-transitory, computer-readable, storage media of claim 13, wherein the class of objects for which accelerated access is to be provided are defined using one or more of:
a storage location in the object storage service where the objects to be provided accelerated access are stored;
a prefix included in respective names of the objects for which accelerated access is to be provided; or
an alpha numeric string included in a name, or other metadata, for the objects for which accelerated access is to be provided.

15. The one or more non-transitory, computer-readable, storage media of claim 14, wherein individual objects for which accelerated access is to be provided are defined using a flag or other indicator included with an access request for the individual object.

16. A method, comprising:
implementing an interface for receiving access requests for objects stored in an object storage service, wherein the interface is configured to:
receive an access request for an accelerated access object stored in the object storage service and
receive an access request for a non-accelerated access object stored in the object storage service;
determining, in response to receiving a given access request at the interface, whether an object targeted by the given access request is an accelerated access object or a non-accelerated access object; and
in response to determining the object targeted by the given access request is a non-accelerated access object, retrieving object data for the object targeted by the given access request from storage devices of the object storage service, the storage devices having a first access performance level, wherein the storage devices store:
a version identifier for the object targeted by the given access request; and
information indicating a storage location at which the object data, for the object targeted by the given access request having the version identifier, is stored on the storage devices having the first access performance level; and
determining, in response to receiving another access request at the interface, whether an object targeted by the other access request is an accelerated access object or a non-accelerated access object; and
in response to determining the object targeted by the other access request is an accelerated access object, retrieving the object data for the object targeted by the other access request from additional storage devices of the object storage service, the additional storage devices having a second access performance level, wherein the additional storage devices store:

a cached copy of the object data for the object targeted by the other access request; and a version identifier for the cached copy of the object data for the object targeted by the other access request.

17. The method of claim 16, further comprising:

automatically managing, by the object storage service, on behalf of a customer of the object storage service, the addition and removal of cached copies of object data and object metadata stored on the additional storage devices.

18. The method of claim 16, wherein:

the storage devices having the first access performance level comprise hard disk drives (HDDs); and the storage devices having the second access performance level comprise solid-state drives (SSDs).

19. The method of claim 16, further comprising:

receiving an access request from a client of the object storage service;

selecting a respective access interface, to route the access request to, from a plurality of respective access interfaces corresponding to respective availability zones of the object storage service;

routing the access request to the selected access interface of the selected availability zone; and in response to receiving additional access request from the client, routing the additional access requests to the selected access interface of the selected availability zone.

20. The method of claim 19, further comprising:

determine the selected availability zone has become unavailable to further additional access request from the client;

selecting another respective access interface, to route the further additional access request to, from the plurality of respective access interfaces corresponding to the respective availability zones of the object storage service; and routing the further additional access request to the other selected access interface of the other selected availability zone, while the initially selected availability zone remains unavailable.

* * * * *